US012639789B2

(12) United States Patent

Jolivet et al.

(10) Patent No.: US 12,639,789 B2

(45) Date of Patent: May 26, 2026

(54) METHOD FOR PROCESSING InSAR IMAGES TO EXTRACT GROUND DEFORMATION SIGNALS

(71) Applicants:PARIS SCIENCES ET LETTRES, Paris (FR); CENTRE NATIONAL DE LA RECHERCHE SCIENTIFIQUE, Paris (FR); TRIAD NATIONAL SECURITY, LLC, Los Alamos, NM (US)

(72) Inventors: Romain Jolivet, Cachan (FR); Bertrand Rouet-Leduc, Los Alamos, NM (US); Paul Johnson, South Santa Fe, NM (US); Claudia Hulbert, Paris (FR); Manon Dalaison, Paris (FR)

(73) Assignees: PARIS SCIENCES ET LETTRES, Paris (FR); CENTRE NATIONAL DE LA RECHERCHE SCIENTIFIQUE, Paris (FR); TRIAD NATIONAL SECURITY, LLC, Los Alamos, CA (US)

( * ) Notice: Subject to any disclaimer, the term of this patent is extended or adjusted under 35 U.S.C. 154(b) by 905 days.

(21) Appl. No.: 17/904,454

(22) PCT Filed: Feb. 15, 2021

(86) PCT No.: PCT/EP2021/053628

§ 371 (c)(1),
(2) Date: Aug. 17, 2022

(87) PCT Pub. No.: WO2021/165197

PCT Pub. Date: Aug. 26, 2021

(65) Prior Publication Data

US 2023/0072382 A1      Mar. 9, 2023

(30) Foreign Application Priority Data

Feb. 17, 2020      (EP) ..................................... 20157709

(51) Int. Cl.
*G06T 5/00* (2024.01)
*G06T 5/50* (2006.01)

(52) U.S. Cl.
CPC ...... *G06T 5/50* (2013.01); *G06T 2207/10044* (2013.01); *G06T 2207/20024* (2013.01);
(Continued)

(58) Field of Classification Search
None
See application file for complete search history.

(56) References Cited

U.S. PATENT DOCUMENTS 4,975,704 A * 12/1990 Gabriel ................... G01S 13/87
342/25 C
8,482,453 B2 * 7/2013 Costantini ........... G01S 13/9023
342/25 R
(Continued)

FOREIGN PATENT DOCUMENTS

| CN | 109541596 A | 3/2019 |
| EP | 3229038 A1 | 10/2017 |
| WO | 2011068783 A1 | 6/2011 |

OTHER PUBLICATIONS

International Search Report and Written Opinion of the International Searching Authority dated Mar. 17, 2021, in connection with International Application No. PCT/EP2021/053628, 13 pages.
(Continued)

*Primary Examiner* — Martin Mushambo

(57) ABSTRACT

The invention relates to a method for processing time series of noisy images of a same area, the method comprising: generating a set of time series of images from an input image time series by combining by first linear combinations each pixel of each image of the input image time series with selected neighboring pixels in the image and in an adjacent image of the input image time series; applying filtering operations in cascade to the set, each filtering operation
(Continued)

combining each pixel of each image of each time series of the set by second linear combinations with selected neighboring pixels in the image and in an adjacent image in each time series of the set; performing an image combination operation to reduce each time series of the set to a single image; introducing a model image of the area as a filtered image in the set; and combining each image in the set into an output image, by third linear combinations.

14 Claims, 6 Drawing Sheets

(52) U.S. Cl.
CPC ............... *G06T 2207/20221* (2013.01); *G06T 2207/30181* (2013.01)

(56)　　　　　References Cited

U.S. PATENT DOCUMENTS

| | | | |
|---|---|---|---|
| 10,495,750 B1 * | 12/2019 | Musgrove | ............. G01S 13/904 |
| 11,841,422 B2 * | 12/2023 | Ikefuji | ................ G01S 13/9011 |
| 2008/0231504 A1 * | 9/2008 | Sartor | ....................... G06T 5/50 |
| | | | 700/89 |
| 2012/0019410 A1 * | 1/2012 | Ferretti | ............... G01S 13/9023 |
| | | | 342/25 C |
| 2019/0005603 A1 * | 1/2019 | Chen | ...................... G06N 3/048 |
| 2020/0394780 A1 * | 12/2020 | Sowter | ............... G01S 13/9027 |

OTHER PUBLICATIONS

Mukherjee, et al., "CNN-based InSAR Denoising and Coherence Metric," arXiv:2001.06954, Jan. 2020, 4 pages.

* cited by examiner

METHOD FOR PROCESSING InSAR IMAGES TO EXTRACT GROUND DEFORMATION SIGNALS

CROSS-REFERENCE TO RELATED APPLICATIONS

This application is a 371 National Stage of International Application No. PCT/EP2021/053628, filed Feb. 15, 2021, which claims priority to European Patent Application No. 20157709.5, filed Feb. 17, 2020, the disclosures of which are herein incorporated by reference in their entirety.

TECHNICAL FIELD

The present invention relates to a method and device for processing images such as Synthetic Aperture Radar (SAR) images from Earth observation satellites, and more particularly, Interferometric SAR (InSAR) images. The present invention applies to extraction from such images of useful information related notably to ground deformations caused by natural phenomena, including tectonic processes and volcanic activity, or caused by human activities, including aquifer depletion, water injection (including wastewater injection and geothermal injection), and extraction activities (including oil, gas, ore). More particularly, the invention applies to detection of slow slip events along faults, detection of precursory slips along active faults.

BACKGROUND

The relative motion between tectonic plates is accommodated by slip on active faults that can, in principle, be measured by InSAR. The classic paradigm is that most faults are locked most of the time. Accumulating elastic stress may be released during large earthquakes, while slip on some faults or portions of faults may be dominantly aseismic and thereby pose little seismic hazard. Studies over the last two decades revealing occurrences of unexpected slip events have shown this picture is simplistic in important ways. Indeed, different kinds of slip phenomena have recently been identified, including low frequency earthquakes, slow slip events and associated tectonic tremor as well as continuous aseismic slip.

Earthquakes pose a significant threat to densely populated regions and, so far, it is impossible to provide any short- or long-term forecast for the occurrence of individual earthquakes. It has been shown theoretically that earthquakes should be preceded by a nucleation phase, during which a tectonic fault starts to slip slowly and accelerates before rupturing rapidly. Detecting such nucleation phase would allow for short-term forecasting of large earthquakes. However, some faults slip slowly, episodically, without generating large earthquakes and, without a dense enough set of observations, it is difficult to efficiently differentiate a harmless slow slip event from a nucleation phase precursory to a devastating event. Moreover, aseismic and seismic slip are closely related: fault creep is thought to precede and often follows earthquakes, underscoring the need for a major advance in the mechanical and physical description of fault slip in general.

Synthetic aperture radar interferometry (InSAR) developed in the early 1990's is now routinely used to measure ground deformations due to hydrologic, volcanic, and tectonic processes. Orbiting satellites now provide daily images of the surface of the Earth and, using the concept of interferometry with a radar system, maps of the evolution of the apparent distance between the ground and the satellite system can be derived. These maps can be assembled to provide continuous monitoring of such distance. This apparent distance is directly related to ground motion over time, hence it is possible today to detect any slow slip event, precursory to a large earthquake or not, anywhere on Earth. The Sentinel 1 InSAR satellite constellation has the potential to enable a systematic mapping of all deforming regions worldwide, revealing mechanisms behind all slip modes of tectonic faults, provided that a robust and automatic method for separating atmospheric signals from fault deformation can be developed. Previous to Sentinel 1 constellation, the typical extent of a SAR image was 100×100 km for the classic C- and L-band satellites (ERS, Envisat, ALOS . . . ), with a pixel size on the order of tens of meters (depending on the wavelength of the Radar and the antenna setup). With the Sentinel constellation, the size of the images is on average 3 times larger and acquisitions are, at minimum, 5 times more frequent. The launch of the Sentinel 1 satellite constellation is transformative in that it provides systematic radar mapping of all actively deforming regions in the world with a 6-day return period. Upcoming satellite launches (NISAR, etc.) will provide even higher resolution and higher frequency InSAR data, furthering the need for automatic detection tools.

InSAR technique has been successfully applied to monitor large displacements due to earthquakes, ice sheet motion, smaller displacements related to aquifer depletion, interseismic deformation, slow moving landslides, and slow slip events. Rapid, large-amplitude deformation signals such as coseismic displacement fields or volcano-tectonic episodes are also routinely analyzed by InSAR. Similarly, the slow but steady accumulation of deformation over relatively long periods of time is also easily detected using InSAR, as the resulting deformation is also sufficiently large. However, these measurements generally have been successful only through painstaking manual exploration of the deformation data sets by experts, thus preventing large scale studies.

The combination of two SAR images into an interferogram (InSAR) allows ground motion to be measured over a wide area. The phase of the interferogram varies as a function of any physical phenomenon that affects the two-way travel time of the radar wave between the radar carrier and the ground. These effects include orbit changes, as well as changes in the atmosphere and ground deformation between acquisitions. Because orbits are well-known, the most important source of noise obscuring measurements of deformation is the spatial and temporal variation of temperature, pressure and water vapor in the atmosphere. Tropospheric and ionospheric delays generate large errors in InSAR processing, often amounting to errors of 10-20 cm which can be considerably larger than the signals of interest. Delays in radar signals are primarily due to water vapor present in the troposphere. These delays have two main identified causes: 1) turbulences in the troposphere, and 2) a component highly connected to local topography. Two primary approaches have been developed in the literature to alleviate this issue and reduce noise. The first approach consists of smoothing or filtering in time, with the assumption that atmospheric noise is stochastic in nature and can be averaged out. These approaches include stacking interferogram time series analysis based upon filtering, and correlation methods. However, atmospheric noise is in fact non-stochastic both in time and space, and smoothing leads to a decrease in the resolution of the signals from the ground. In other words, these methods have been shown to partially mask out the signals of interest.

The second approach relies on additional datasets to estimate delays and mitigate noise in ground deformation estimates, including meteorological data, water vapor maps from spectroradiometer and spectrometer data, geographic position data (from a Global Navigation Satellite system), and estimates from weather models and simulations. These different datasets all have their merits and drawbacks. Atmospheric models may suffer from systematic or localized errors. Water vapor maps have a high spatial resolution but a relatively poor time resolution, and are limited when clouds are present. In contrast, geographic position data provide the highest time resolution estimates of atmospheric delays, but requires stations on Earth's surface, and the data are limited spatially to available stations (interpolation between stations is not obvious and it is difficult to assess its quality). At present there exists no reliable, universally used approach to mitigate the impact of atmosphere-induced errors on InSAR ground motion estimations.

Thus, the detection of low-amplitude, long-wavelength deformation fields such as those due to interseismic strain accumulations or postseismic motions remains challenging because of interferometric decorrelation, inaccurate orbits of the satellites, and atmospheric propagation delays: if the atmosphere slows down the satellite signal, the distance between the ground and the satellite appears to increase, as if the ground had moved. In order to attain this goal, significant advances in InSAR measurement of slow deformation must be made.

Therefore, the systematic detection of these slip events along tectonic faults is not yet possible, although the data are available in the InSAR images. In fact, existing solutions rely on human-based detection through visual inspection of InSAR time series of images of ground motion, where the signal is a mix of atmospheric noises and tectonic signals.

Accordingly, there is a need for automatically processing massive time series of image sets such as InSAR images time series to remove or attenuate atmospheric perturbations, with a view to highlighting the smallest possible deformation signals of all kinds. There is also a need for a systematic and global detection and characterization of low-amplitude, and/or long-wavelength ground deformations at different scales, with a view to confidently differentiating between harmless slow slip events and small events related to precursory phases to earthquakes. it may also be desirable to identify fault deformation without requiring expert interpretation.

SUMMARY

A method is described for processing time series of images of a same area, subjected to noise. The method may include: executing a plurality of successive filtering steps comprising a first filtering step receiving an input image time series, a last filtering step providing an output image, and intermediary filtering steps, each of the first filtering step and the intermediary filtering steps transforming a set of time series of filtered images initially including the input image time series, the set being transformed by generating a number of time series of filtered images by combining by linear combinations each pixel of each image of each time series of the set with selected neighboring pixels in the image and in an adjacent image of the image time series of the set, each linear combinations using a respective set of weighting coefficients and resulting in a pixel of one of the generated filtered images; and executing one or more combination operations, each combination operation being performed between two successive of the intermediary filtering steps, to reduce a number of images in each of the time series of filtered images of the set, by combining images of subsets of adjacent images in each of the time series of filtered images of the set, a last one of the combination operations reducing each time series of filtered images of the set to a single filtered image.

According to an embodiment, the method further comprises, after the last combination operation, introducing a model image of the area in the set as an additional filtered image, the introduction of the model image being followed by one or more of the filtering steps.

According to an embodiment, each of the linear combinations includes a bias coefficient which is added to a result of the linear combination.

According to an embodiment: each of the weighting coefficients has a value depending on a sign, positive or negative of a pixel value to which it is multiplied, or the result of each of the linear combinations is transformed by a rectified linear unit function.

According to an embodiment, the method further comprises: generating first image time series from a ground deformation model using randomly selected parameters; generating training image time series, from the first image time series, using models of different noise signals; and using the generated training time series to adjust the values of the weighting coefficients.

According to an embodiment, the values of the weighting coefficients are iteratively adjusted by applying an iterative gradient-based descent minimization method using the training image time series and a model cost function, so as to minimize the result of the model cost function.

According to an embodiment, the generation of the set of times series of filtered images from the input image time series are performed using the following equation:

$$PX[i, j, t, f] =$$
$$LR\left(B[f] + \sum_{l=1}^{L}\sum_{m=1}^{M}\sum_{u=1}^{U}(W[l, m, u, f].PX[i+3l, j+3m, t+u])\right)$$

wherein PX[i, j, t, f] is one pixel of one of the filtered images of the time series f of filtered images, PX[i, j, t] is one pixel of one image of the input image time series, W[l, m, u, f] is one of the first coefficients for the time series f of filtered images, B[f] is a bias coefficient for the time series f, and LR( ) is a rectified linear unit function.

According to an embodiment, each linear combination of first filtering operations of the filtering operations applies the following equation:

$$PX[i, j, f'] = LR$$
$$\left(B[s, f'] + \sum_{l=1}^{L}\sum_{m=1}^{M}\sum_{u=1}^{U}\sum_{f=1}^{F}(W[s, l, m, u, f, f'].PX[i+3l, j+3m, t+u, f])\right)$$

wherein PX[i, j, t, f'] is one pixel of one of the filtered images of the time series of filtered images f', W[s, l, m, u, f, f'] is one of the second weighting coefficients for the time series f' of filtered images for the filtering operation s, B[s, f'] is a bias coefficient for the time series f' and the filtering operation s, and LR( ) is a leaky rectified linear unit function.

According to an embodiment, each linear combination of second filtering operations of the filtering operations applies the following equation:

$$PX[i, j, f'] =$$

$$LR\left(B[s, f'] + \sum_{l=1}^{L}\sum_{m=1}^{M}\sum_{f=1}^{F}(W[s, l, m, f, f'].PX[i + 3l, j + 3m, f])\right)$$

wherein PX[i, j, f'] is one pixel of one of the filtered images f', W[s, l, m, f, f'] is one of the second weighting coefficients for the filtered images f' for the filtering operation s, B[s, f'] is a bias coefficient for the filtered images f' and the filtering operation s, and LR( ) is a leaky rectified linear unit function.

According to an embodiment, each pixel of the output image is computed by the following equation:

$$PX[i, j] = LR\left(B + \sum_{l=1}^{L}\sum_{m=1}^{M}\sum_{f=1}^{F}(W[l, m, f].PX[i + 3l, j + 3m, f])\right)$$

wherein PX[i, j] is one pixel of the output image, PX[i, j, f] is one pixel of the filtered image f, W[l, m, f] is one of the third coefficients, B is a bias coefficient, and LR( ) is a leaky rectified linear unit function.

According to an embodiment, the leaky rectified linear unit function LR is such that $LR(x) = x$ if $x \geq 0$ and $LR(x) = 0.5x$ if $x < 0$.

According to an embodiment, each of the image combination operations applies the following equation:

$$PX[i, j, t, f] = \underset{u=1,2,3}{\text{MAX}} (PX[i, j, 3(t-1) + u, f])$$

wherein PX[i, j, t, f] is one pixel of one of the filtered images of the time series of filtered images f, and MAX(PX[i, j, t+u, f]) is a function providing the maximum value among the pixel values PX[i, j, t+u, f] with u=−1, 0 and 1.

Embodiments may also relate to a computer comprising a processor, a memory, the processor being configured to carry out the above-disclosed method.

According to an embodiment, the computer further comprises a graphic processor controlled by the processor, the processor being configured to configure the graphic processor to carry out some of the operations of the above-disclosed method.

Embodiments may also relate to a computer program product loadable into a computer memory and comprising code portions which, when carried out by a computer, configure the computer to carry out the above-disclosed method.

BRIEF DESCRIPTION OF THE DRAWINGS

The method and/or device may be better understood with reference to the following drawings and description. Non-limiting and non-exhaustive descriptions are described with the following drawings. In the figures, like referenced signs may refer to like parts throughout the different figures unless otherwise specified.

DETAILED DESCRIPTION

A method for processing images such as InSAR images is disclosed. This method comprises:

1) reconstruction of coherent images in terms of phase;
2) correction of the images to take into account satellite positions errors;
3) removal of atmospheric noise; and
4) reconstruction of deformation time series.

An embodiment of software on a computer is described below as a set of computer readable program components that cooperate to control the performance of operations of data processing when loaded and executed on the computer. It will be apparent to a person skilled in the art that the individual steps of methods of the present invention can be implemented in computer program code and that a variety of programming languages and coding implementations may be used to implement the methods described herein. Moreover, computer programs included in the software are not intended to be limited to the specific control flows described herein, and one or more of the steps of the computer programs may be performed in parallel or sequentially. One or more of the operations described in the context of a computer-program-controlled implementation could alternatively be implemented as a hardware electronics component.

Figure 1:
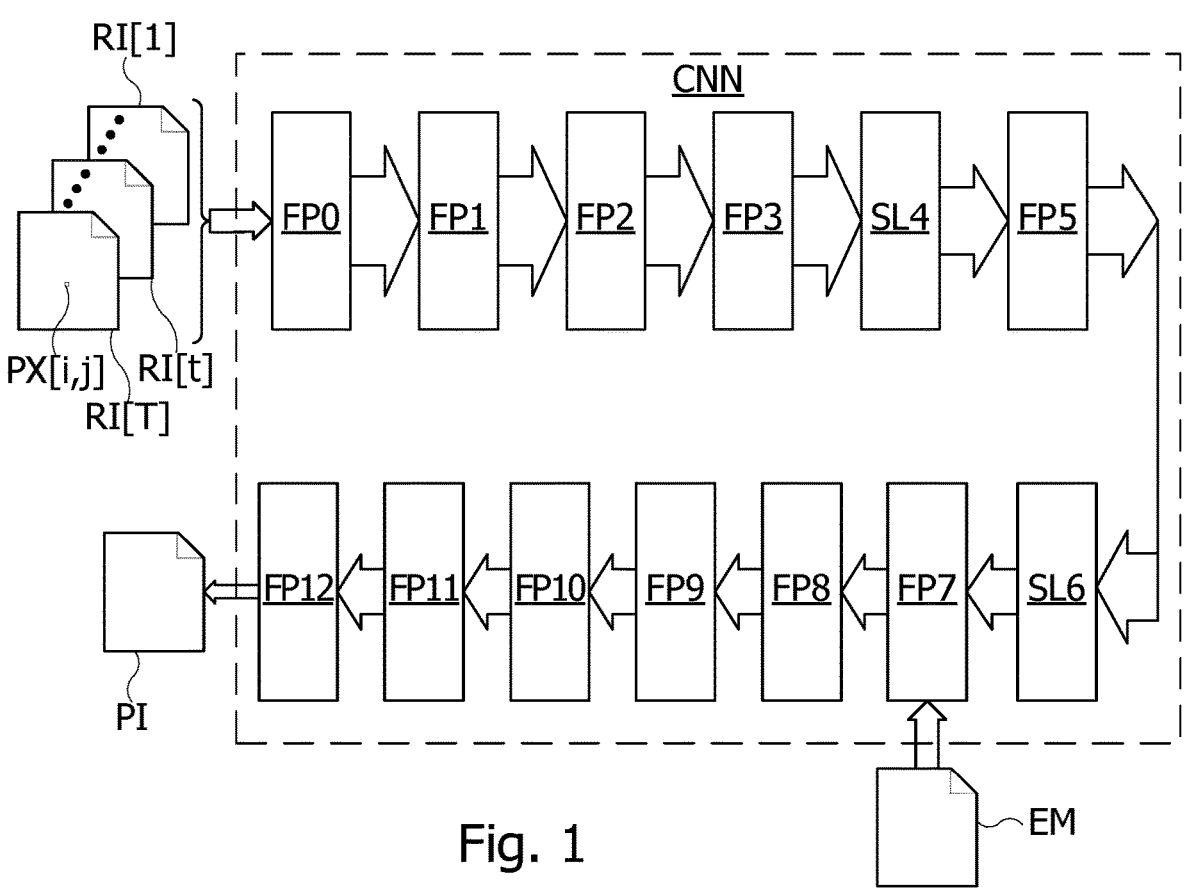
FIG. 1 is a block diagram of processing stages of a computer implementing a method for processing images, according to an embodiment.

FIG. 1 illustrates operations of a method performed by a computer according to an embodiment, for removing the atmospheric noise from the images with the satellite positions errors corrected (Step 3). FIG. 1 shows processing stages FP0, FP1, FP2, FP3, SL4, FP5, SL6, FP7, FP8, FP9, FP10, FP11, FP12 connected in series, of a convolutional neural network CNN configured to successively process a time series RI of images for removing noise and especially atmospheric noise. Each image RI[t] of the time series RI comprises a set of pixels PX[i, j] where i=1, . . . X, and j=1, . . . Y. The image time series RI comprises T images RI[1], . . . RI[T] of a same scene area (e.g. same ground region) taken at different times or acquired at given time intervals. The image time series RI is processed by a first processing stage, the images computed by each of the stages being provided to the next stage, until a last processing or output stage FP12 which provides an output image PI in which the atmospheric noise is absent or strongly attenuated, but in which ground motion signals present in the input time series RI of images are still present.

Figure 2:
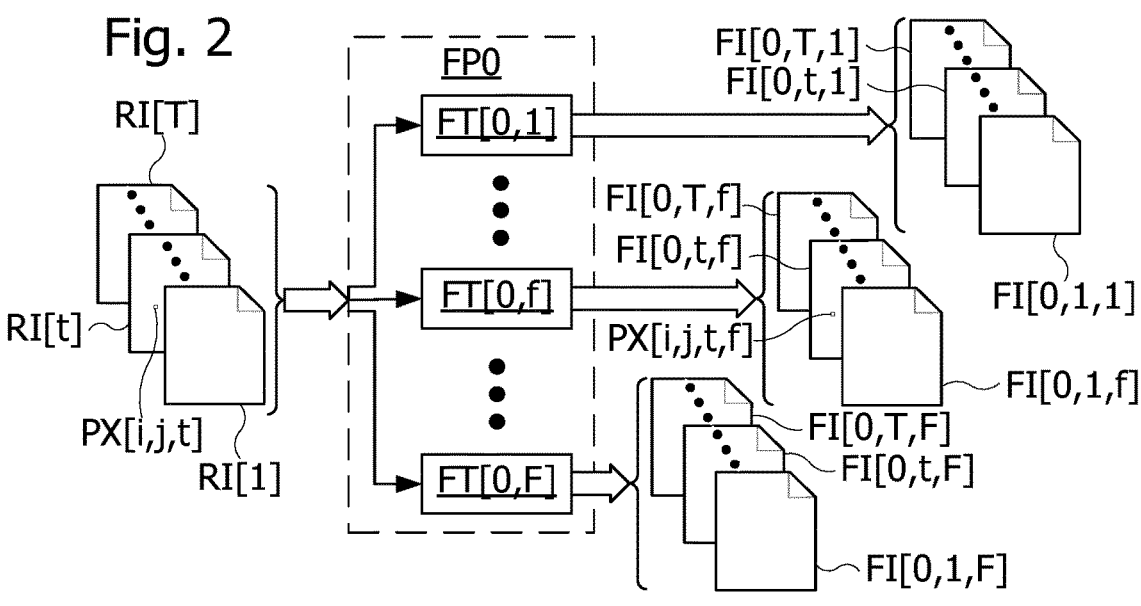
FIG. 2 is a block diagram of a first processing stage of the processor, according to an embodiment.

FIG. 2 illustrates the first processing or input stage FP0, according to an embodiment. The processing stage FP0 comprises F filtering components FT[0, f], with f equal to 0 to F, each filtering component FT[0, f] processing the input time series RI. "0" in the notation FT[0, f] refers to a number assigned to the first processing stage FP0. Each filtering component FT[0, f] generates a time series FI[0, f] of T filtered images FI[0, f, t]. Therefore, the processing stage FP0 generate F time series of filtered images FI[0, f, t].

Figure 3:
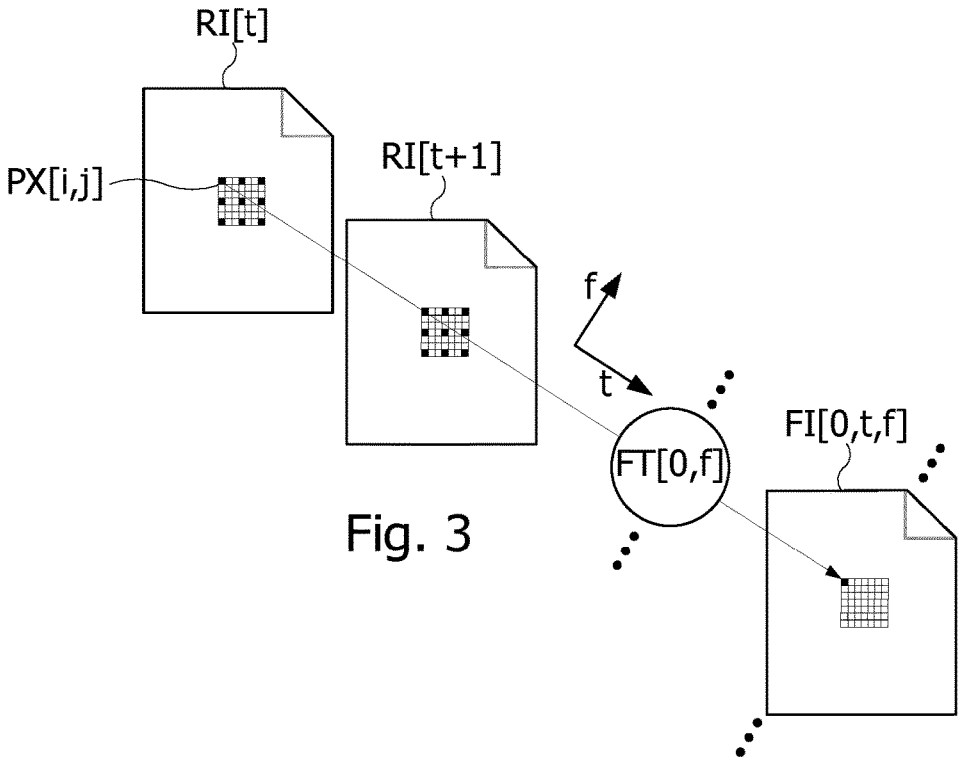
FIG. 3 is a block diagram illustrating the operation performed by the first processing stage to compute one pixel value, according to an embodiment.

FIG. 3 illustrates the operation performed by each filtering component FT[0, f] of the first processing stage FP0, according to an embodiment. Each pixel PX[i, j, t, f] of each filtered image FI[0, t, f] is computed by a corresponding filtering component FT[0, f] by performing a linear combination of selected neighboring pixels (black pixels in images RI[t] and RI[t+1] in FIG. 3) in the vicinity of the pixel PX[i, j, t] in the three-dimensional pixel table PX including all pixels of the input time series RI. A bias coefficient can be added to the result of the linear combination and the addition result can be transformed by a rectified linear unit (ReLU) function, which can be of the type "leaky". The ReLU function is an activation function responsible for transforming the summed weighted input from the stage into the activation of the stage or output for that input. Generally, the ReLU function is a piecewise linear function that will output the input directly if is positive, otherwise, it will output zero. The purpose is to eliminate a problem known as the 'vanishing gradient problem' that may prevent deep networks from learning effectively. Other activation functions could be used. A leaky ReLU function keeps the negative values with a linear attenuation coefficient.

According to an embodiment, each pixel PX[i, j, t, f] (i=1, ... X, j=1, ... Y, t=1, ... T, f=1, ... F) of each filtered image FI[0, t, f] is computed by the corresponding filtering component FT[0, f], according to the following equation:

$$PX[i, j, t, f] =$$
$$LR\left(B[0, f] + \sum_{l=1}^{L}\sum_{m=1}^{M}\sum_{u=1}^{U}(W[0, l, m, u, f].PX[i + a.l, j + b.m, t + c.u])\right) \quad (1)$$

where LR is the leaky ReLU function, B[0] is a one-dimensional table of bias coefficients B[0, f], each representing a constant value used by the filtering component FT[0, f], W[0] is a four-dimensional table of weighting coefficients W[0, l, m, u, f] having the following dimensions (1 ... L, 1 ... M, 1 ... U, 1 ... F), the weighting coefficients W[0, l, m, u, f] having real values, and a, b, c are coefficients which can be adjusted with the parameters L, M and U to select in the table PX the neighboring pixels which are involved in the linear combinations. The pixels outside the images RI[t], i.e. when i+a.l>X, and/or j+b.m>Y, and/or t+c.u>T are set to 0.

According to an example, LR(x)=x if x≥0 and LR(x)=0.5x if x<0. In the example of FIG. 3, L and M are set to 3, U is set to 2, a and b are set to 3 and c is set to 1. Therefore, each pixel PX[i, j, t, f] of each filtered image FI[0, t, f] is computed from 9 neighboring pixels in each of the images RI[t] and RI[t+1] of the image time series RI[1 ... T].

Figure 4:
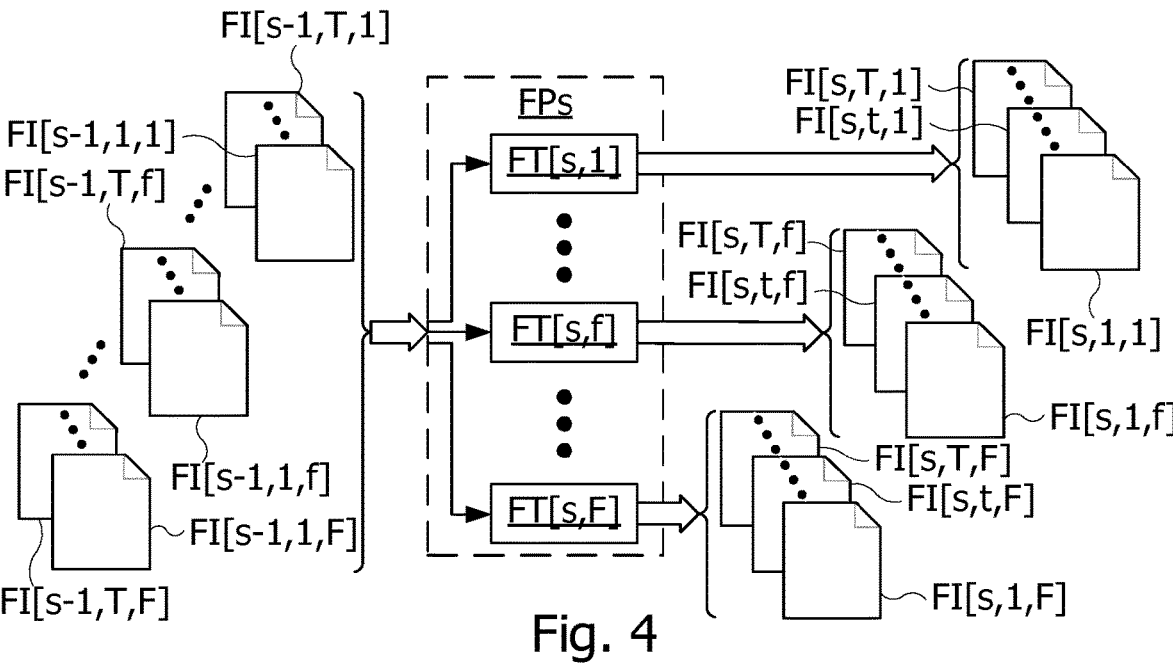
FIG. 4 is a block diagram of a second processing stage of the processor, according to an embodiment.

FIG. 4 illustrates the processing stages FP1, FP2, FP3 and FP5, according to an embodiment. Each of the processing stages FP1-FP3, FP5 comprises F filtering components FT[s, f], with s equal to 1, 2, 3 or 5, and f equal to 1 to F, each filtering component FT[s, f] processing the filtered image time series FI[s−1, t]. Each filtering component FT[s, f] generates time series of T filtered images FI[s, t, f]. Therefore, each processing stage FPs (s:1, 2, 3 or 5) generates F time series of T filtered images.

Figure 5:
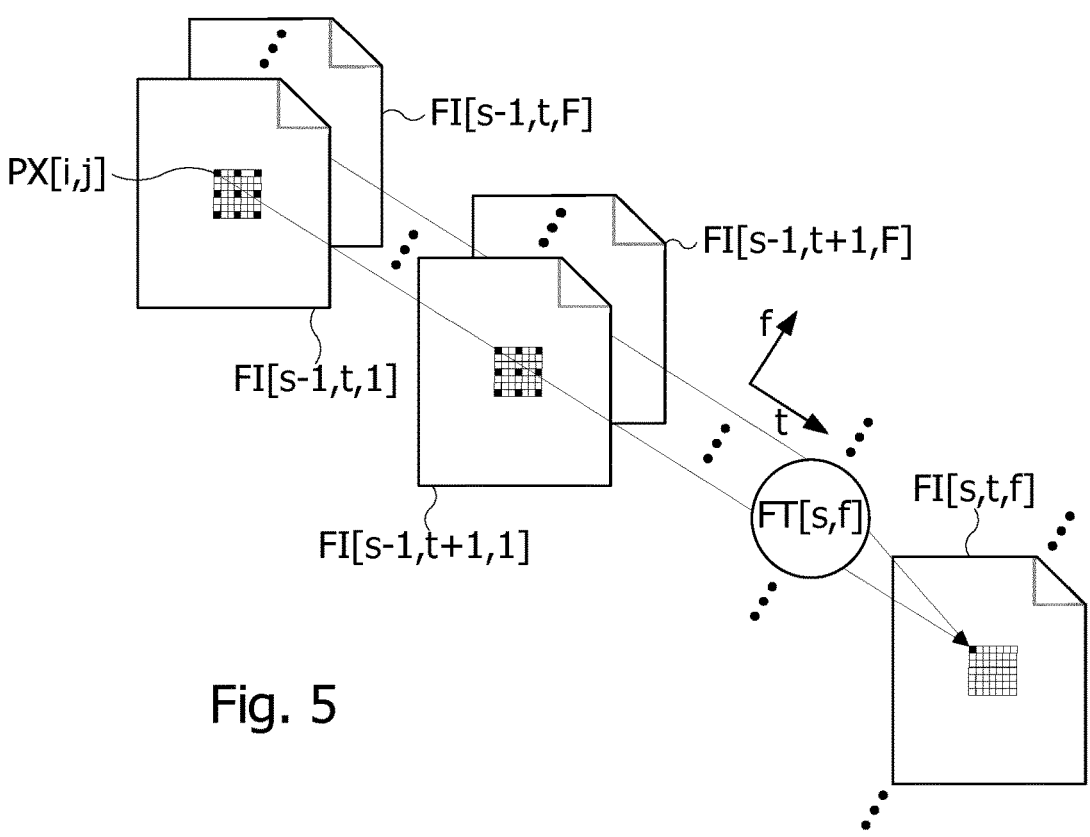
FIG. 5 is a block diagram illustrating the operation performed by the second processing stage to compute one pixel value, according to an embodiment.

FIG. 5 illustrates the operation performed by each filtering component FT[s, f] of the processing stage FPs (s=1, 2, 3 or 5), according to an embodiment. Each pixel PX[i, j, t, f] of each filtered image FI[s, t, f] is computed by a corresponding filtering component FT[s, f] by performing a linear combination of selected neighboring pixels (black pixels in images FI[s−1, t, f] and FI[s−1, t+1, f] in FIG. 5) in the vicinity of the pixel PX[i, j, t, f] in the three-dimensional pixel table PX[i, j, t, f] in all the F time series of filtered images FI[s, t, f]. Again a bias coefficient can be added to the result of the linear combination and the addition result can be transformed by the same rectified linear unit (ReLU) function.

According to an embodiment, each pixel PX[i, j, t, f'] of each filtered image FI[s, t, f'] (f' equal to 1 to F) is computed by the corresponding filtering component FT[s, f], according to the following equation:

$$PX[i, j, t, f'] = LR\left(B[s, f'] + \sum_{l=1}^{L}\sum_{m=1}^{M}\sum_{u=1}^{U}\sum_{f=1}^{F}(W[s, l, m, u, f, f'].PX[i + a.l, j + b.m, t + c.u, f])\right) \quad (2)$$

where B[s, f'] is a two-dimensional table of bias coefficients B[s, f'], each having a constant value attributed to the filtering component FT[s, f'], W[s] (s=1, 2, 3 or 5) is a five-dimensional table of weighting coefficients W[s, l, m, u, f, f'] having the following dimensions (1 ... L, 1 ... M, 1 ... U, 1 ... F, 1 ... F), the weighting coefficients W[s, l, m, u, f, f] having real values, and a, b, c are coefficients which can be adjusted with the parameters L, M and U to select in the table PX the neighboring pixels which are involved in the linear combinations.

According to an example, LR(x)=x if x≥0 and LR(x)=0.5x if x<0. In the example of FIG. 5, L and M are set to 3, and U is set to 2, a and b are set to 3 and c is set to 1. Therefore, each pixel PX[i, j, t, f] of each filtered image FI[s, t, f] is computed from 9 neighboring pixels (from the pixel PX[i, j]) in all of the image sets FI[s−1, t, f] and FI[s−1, t+1, f], with f=1, ... F, i.e. each pixel PX[i, j, t, f] of each filtered image FI[s, t, f] is computed from 3×3×2×F pixels.

Figure 6:
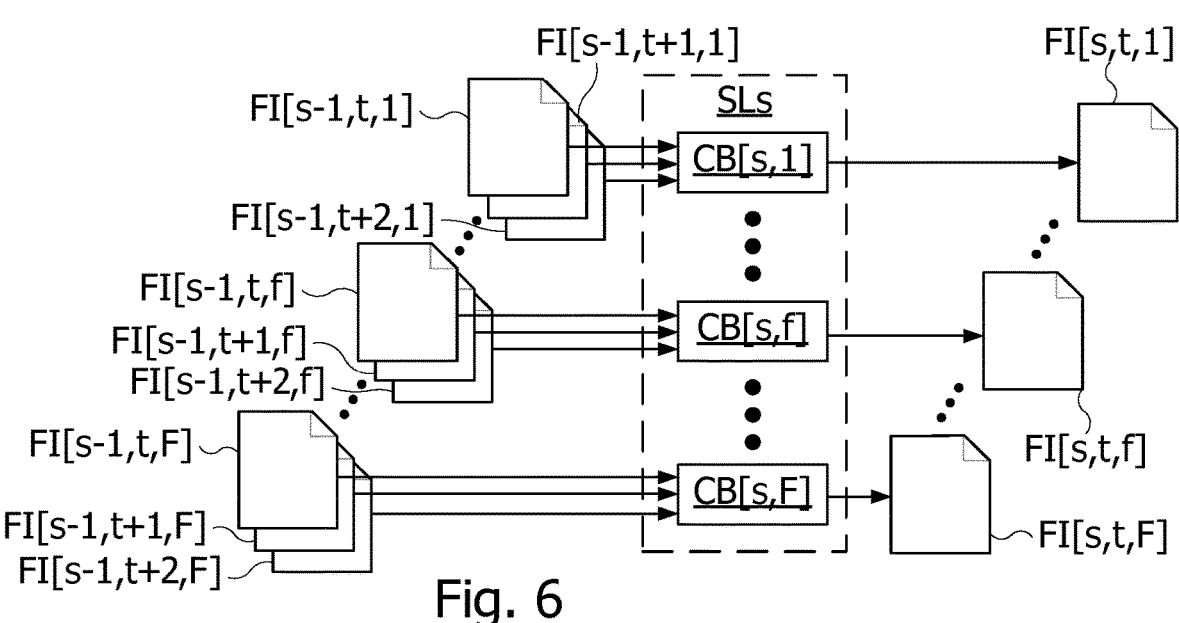
FIG. 6 is a block diagram of a third processing stage of the processor, according to an embodiment.
Figure 7:
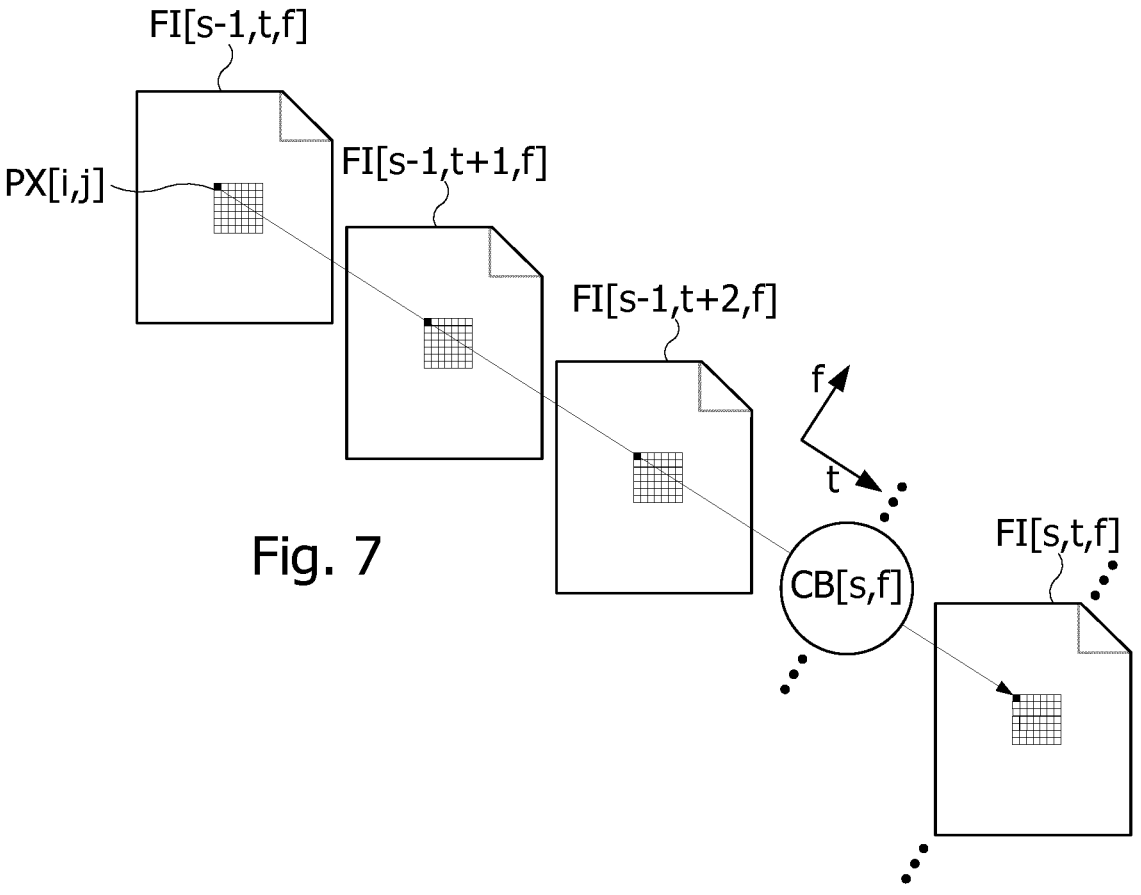
FIG. 7 is a block diagram illustrating the operation performed by the third processing stage to compute one pixel value, according to an embodiment.

FIGS. 6 and 7 illustrate the processing stages SL4 and SL6 of the processor, according to an embodiment. Each of the processing stages SL4 and SL6 comprises F combining components CB[s, f] (with s equal to 4 or 6, and f equal to 1 to F), each combining component CB[s, f] processing the filtered image time series FI[s−1, t] and providing a time series of T/n filtered images FI[s, t, f], T being a multiple of n. The combination operations performed by the combining component CB[s, f] combines all the groups of pixels PX[i, j, t], PX[i, j, t+1], ... [i, j, t+k] in each of the F time series FI[s−1, f] of filtered images, into respective single resultant pixels, each pixel in each of the filtered images FI[s−1, t, f] being considered only once to compute the time series FI[s, f], and k representing the number of filtered images FI[s, t, f] combined by the combining component CB[s, f].

According to an embodiment, each pixel PX[i, j, t, f] of each filtered image FI[s, t, f] (f equal to 1 to F) is computed from three filtered images FI[s−1, t], FI[s−1, t+1] and FI[s−1, t+2] by the corresponding combining component CB[s, f], according to the following equation:

$$PX[i, j, t, f] = \underset{u=1,2,3}{\text{MAX}} \; (PX[i, j, 3(t-1)+u, f]) \qquad (3)$$

where MAX is a function providing the greatest value in each group of three pixels PX[i, j, 3(t−1)+1], PX[i, j, 3(t−1)+2] and PX[i, j, 3(t−1)+3], t being equal to 1, 2, . . . T/3. As a result, each of the time series of filtered images FI(s, f) provided by the processing stages SL4 and SL6 comprises T/3 images, T being a multiple of 3.

After the processing stage SL6, only one image FI(s, f) remains in each of the time series of filtered images FI(s, f, t).

Figure 8:
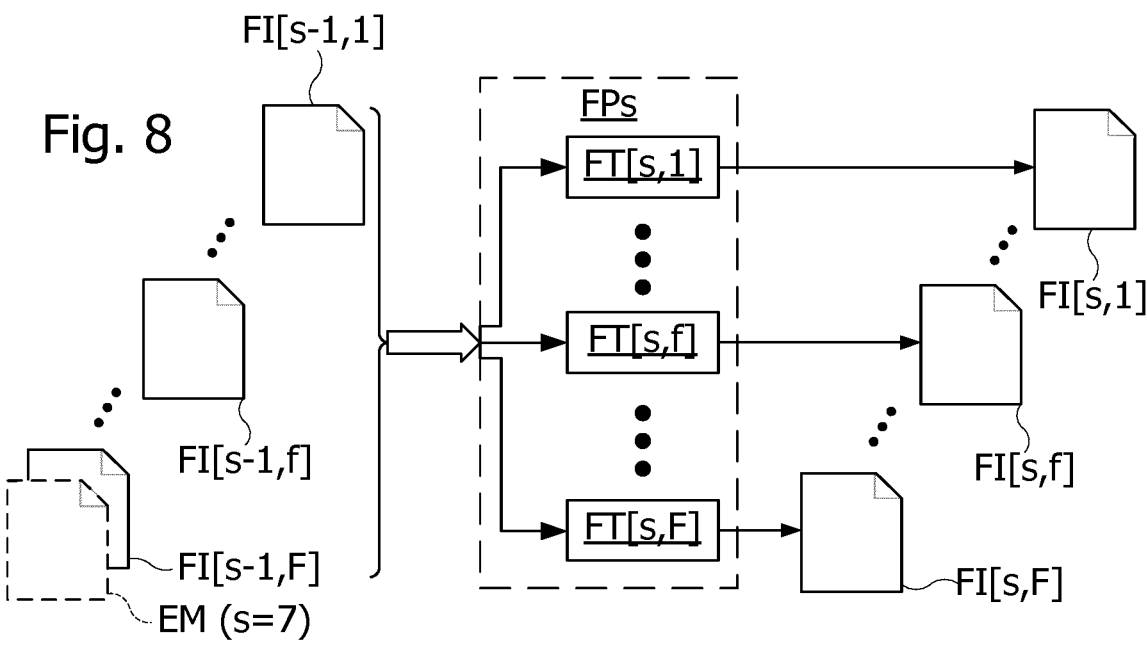
FIG. 8 is a block diagram of a fourth processing stage of the processor, according to an embodiment.

FIG. 8 illustrates the processing stage FP7, FP8, FP9, FP10 of the processor, according to an embodiment. Each of the processing stages FP7-FP10 comprises F filtering components FT[s, f], with s equal to 7, 8, 9 or 10, and f equal to 1 to F, each filtering component FT[s, f] processing the filtered image FI[s−1, f] and generating one filtered image FI[s, f].

Figure 9:
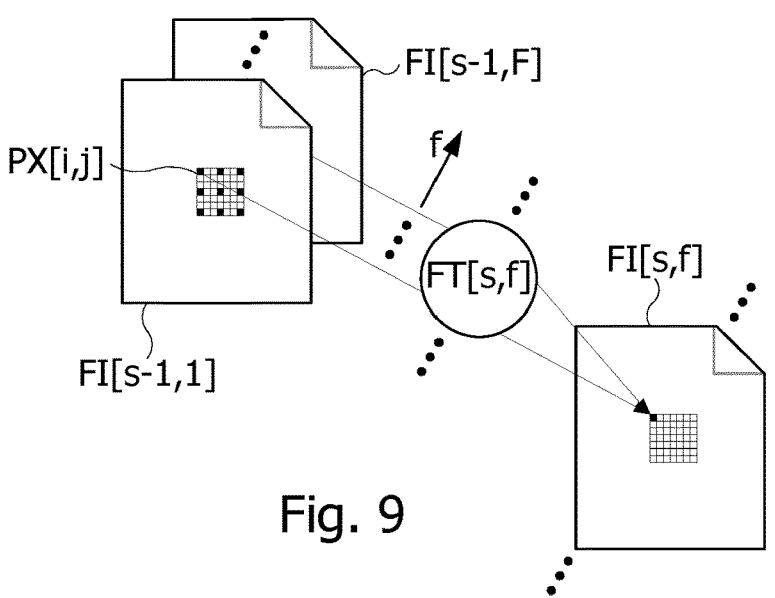
FIG. 9 is a block diagram illustrating the operation performed by the fourth processing stage to compute one pixel value, according to an embodiment.

FIG. 9 illustrates the operation performed by each filtering component FT[s, f] of the processing stage FP[s] (s=7, 8, 9, 10 or 11), according to an embodiment. Each pixel PX[i, j, f] of each filtered image FI[s, f] is computed by a corresponding filtering component FT[s, f] by performing a linear combination of selected neighboring pixels (black pixels in image FI[s−1, f] in FIG. 9) in the vicinity of the pixel PX[i, j, f] in the three-dimensional pixel table PX in all the F filtered images FI[s, f]. Again a bias coefficient can be added to the result of the linear combination and the addition result can be transformed by the same rectified linear unit (ReLU) function.

According to an embodiment, each pixel PX[i, j, f'] of each filtered image FI[s, f'] (f' equal to 1 to F) is computed by the corresponding filtering component FT[s, f], according to the following equation:

$$PX[i, j, f'] =$$

$$LR\left( B[s, f'] + \sum_{l=1}^{L} \sum_{m=1}^{M} \sum_{f=1}^{F} (W[s, l, m, f, f'].PX[i + a.l, j + b.m, f]) \right) \qquad (4)$$

where B[s] is a one-dimensional table of bias coefficients B[s, f'], each having a constant value attributed to the filtering component FT[s, f'], W[s] are four-dimensional tables of weighting coefficients W[s, l, m, f, f'], with s=7, 8, 9, 10 or 11, having the following dimensions (1 . . . L, 1 . . . M, 1 . . . F, 1 . . . F), the weighting coefficients W[s, l, m, f, f'] having real values, and a and b are coefficients which can be adjusted with the parameters L and M to select in the table PX the neighboring pixels which are involved in the linear combinations. In the example of FIG. 9, L and M are set to 3, and a and b are set to 3. Therefore, each pixel PX[i, j] of each of the filtered images FI[s, f] is computed from 9 neighboring pixels (from the position [i, j]) in all the images FI[s−1, f] (f=1 to F).

The image EM of the elevation model of the ground area imaged by the image time series RI[t] is introduced in the processing stage FP7 as a filtered image having the index F+1. Therefore, in the computations performed at processing stage FP7, the summation on index f in equation (4) is performed between 1 and F+1, and the four-dimensional table W[7] has the following dimensions (1 . . . L, 1 . . . M, 1 . . . F+1, 1 . . . F). In the processing stages FP8-FP11, the four-dimensional tables W[s] have the following dimensions (1 . . . L, 1 . . . M, 1 . . . F, 1 . . . F).

Figure 10:
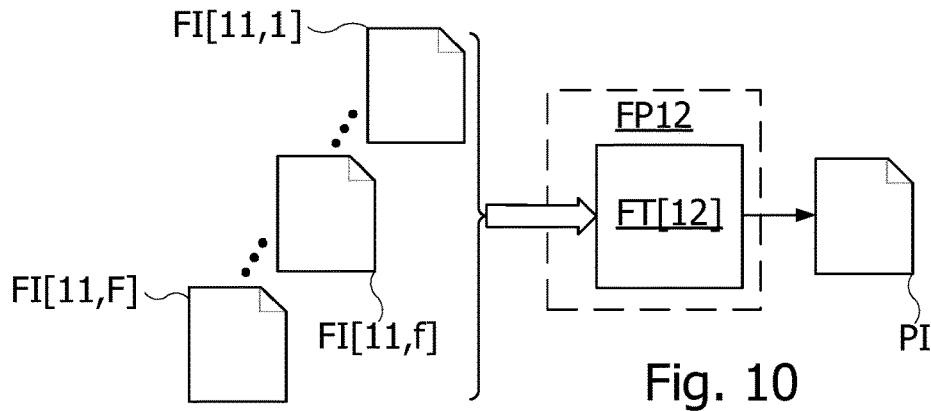
FIG. 10 is a block diagram of a fifth processing stage of the processor, according to an embodiment.

FIG. 10 illustrates the last processing or output stage FP12 of the processor, according to an embodiment. The output stage FP12 comprises one filtering component FT[12] processing the filtered images FI[11, f] to generate the output image PI.

Figure 11:
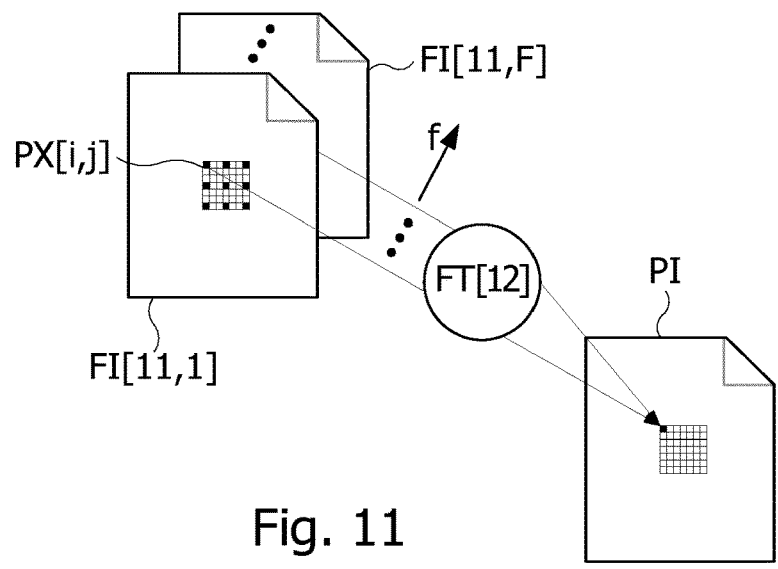
FIG. 11 is a block diagram illustrating the operation performed by the fifth processing stage to compute one pixel value, according to an embodiment.

FIG. 11 illustrates the operation performed by the filtering component FT[12] of the output stage FP12 according to an embodiment. Each pixel PI[i, j] of the output image PI is computed by the filtering component FT[12] by performing a linear combination of selected neighboring pixels in the vicinity of the computed pixel in the three-dimensional pixel table PX[i, j, f] comprising all the pixels of the F filtered images FI[11, f]. Again a bias coefficient can be added to the result of the linear combination and the addition result can be transformed by the same rectified linear unit (ReLU) function.

According to an embodiment, each pixel PX[i, j] of the output image PI is computed by the filtering component FT[11], according to the following equation:

$$PX[i, j] =$$

$$LR\left( B[12] + \sum_{l=1}^{L} \sum_{m=1}^{M} \sum_{f=1}^{F} (W[12, l, m, f].PX[i + a.l, j + b.m, f]) \right) \qquad (5)$$

where W[12] is a three-dimensional table of weighting coefficients W[12, l, m, f] having the following dimensions (1 . . . L, 1 . . . M, 1 . . . F], the weighting coefficients W[12, l, m, f] having real values and a and b are coefficients which can be adjusted with the parameters L and M to select in the table PX the neighboring pixels which are involved in the linear combinations. In the example of FIG. 11, L and M are set to 3, and a and b are set to 3. Therefore, each pixel PX[i, j] of the output image PI is computed from 9 neighboring pixels in each of the images FI[11, f] (f=1 to F).

The choice of the number F of filtering components FT[s, f] in the stages FPs (s=1-3, 5, 7-11) results from a trade-off between efficiency of the neural network to remove the noise from the input images and computation time. Generally, the number F is set between 10 and 100. In the above examples, F is set to 64. Therefore:

- W[0] includes 2×3×3×64(=1162) weighting coefficients, and B[0, f] includes 64 bias coefficients,
- W[s] and B[s, f], with s=1, 2, 3 and 5, include respectively 2×3×3×64×64(=73728) weighting coefficients, and 64 bias coefficients,
- W[7] includes 3×3×64×65(=37440) weighting coefficients, and B[7, f] includes 64 bias coefficients,
- W[s] and B[s, f], with s=8, 9, 10 and 11, include respectively 3×3×64×64(=36864) weighting coefficients, and 64 bias coefficients, and
- W[12] includes 3×3×64(=576) weighting coefficients, and B[12] represents one bias coefficient.

According to an embodiment, all the coefficients W and B are determined by means of a learning phase using training data. According to an embodiment, the training data comprise of millions or billions of time series of images that are generated from simulations of ground motion using simple elastic models of faulting. The times series of images are for example generated by randomly generating a slowly sleeping fault with random latitude, longitude, depth, strike angle, dip angle and width. Then the ground deformation time series are corrupted with a variety of noise signals. For example, a spatially correlated Gaussian noise simulates delays introduced in the InSAR images by the atmospheric turbulences of various length scales. Further, a variety of additional spurious signals can be used to further corrupt the ground deformation time series. For example, transient faulting signals can be added so as to simulate the worst case scenario of very sharp weather related signals that look like faulting signals, but without correlation over time. Wrong pixels or pixel patches simulating pixel decorrelation and unwrapping errors can also be introduced in the time series of images.

Each training image time series is associated with the final image to be provided by the neural network CNN. Training the neural network comprises finding a solution to a system of equations where the unknowns are the coefficients W and B, the pixels PX[i, j] of the image time series RI and of the resulting image PI being known from a training case. According to an embodiment a solution is computed by using an iterative gradient-based descent minimization method using a model cost function, initial values for the coefficients W and B being randomly selected between −1 and 1, such as to have a uniform distribution.

According to an embodiment, the model cost function MCF used is the error norm of the deformation reconstruction, e.g. the sum of the absolute values of the reconstruction errors for each pixel:

$$MCF = \sum_i \sum_j |CPX[i, j] - MPX[i, j]| \qquad (6)$$

where CPX[i, j] represents a computed pixel in the image PI provided by the neural network CNN from a training image time series, and MPX[i, j] represents the corresponding pixel in the final image to be provided, associated with the training image time series PI. The coefficients W and B are iteratively adjusted so as to minimize the result of the model cost function MCF on groups of training data. When using such a cost function which is not convex, it is almost certain to never meet a global minimum, but only local minimums depending on initial values. Thus it is ensured to reach a unique set of coefficients W, B depending on the training data.

According to an embodiment, coefficients W and B are updated at each iteration, based on the gradient of the cost function calculated from a batch of data, following the ADAM rule, according to the following equation:

$$w = w - wstp \frac{\bar{m}}{\bar{v}^{1/2} + \varepsilon} \qquad (7)$$

wherein:

w is one of the coefficients W and B, wstp and ε are constant values, respectively set to 0.001 and $10^{-6}$, $$\bar{m} = \frac{m}{(1 - \beta_1^t)} \text{ and } \bar{v} = \frac{v}{(1 - \beta_2^t)}, \qquad (8)$$

$m=\beta_1 m+g(1-\beta_1)$, $v=\beta_2 v+g^2(1-\beta_2)$, m and v being initially set to 0, $\beta_1$ and $\beta_2$ being constant values respectively set to 0.9 and 0.999, and t being the iteration number, g=gradient(x, y), x being the set of temporal series used in one iteration, y is the corresponding true output deformation, and g can be set to the mean value of the gradient of the cost function as a function of the model parameters, It is apparent to those of ordinary skill in the art that other gradient descent algorithms can equally be employed to adjust the coefficients W and B of the model.

An advantage of purely convolutional neural networks is that the size of the images to be processed do not depend on the size of the training images: all the above equations (1) to (5) compute a single pixel and are used to compute each pixel of the images, and thus do not depend on the number of pixels of these images.

According to an embodiment, the neural network is trained using synthetic training time series comprising nine images of 40×40 pixels generated from modeled ground deformations and modeled noise.

To test the efficiency of the trained convolutional network CNN, it is used to process InSAR time series of images from two regions that have already been 'manually' analyzed by experts: the North Anatolian fault in Turkey (COSMO-SkyMed data), and the Chaman fault at the border between Afghanistan and Pakistan (Sentinel 1 data). The InSAR images from Chaman comprise time series of 9 images of 7024×2488 pixels covering an area of roughly 180 000 km2. Both in Turkey and in Chaman, signals stronger than signals identified by experts as faulting remain in the data even after conventional atmospheric corrections. In both cases, a priori knowledge of fault location and manual inspection of the data has been necessary to produce fault deformation time series. The neural network CNN trained using synthetic training data and with no further fine tuning on real data, automatically isolates and recovers clean deformation signals in Turkey and Chaman where expert analysis also found signal. On the North Anatolian fault time series, the neural network CNN found a 1.5 cm line of sight slip, with virtually no noise signal remaining elsewhere than on the fault, without human intervention, and without having the knowledge of the location of the fault.

It should be observed that all the calculations performed when executing the neural network CNN to extract ground deformation from the time series of images from Chaman can be done on a graphics processor of a conventional personal computer, with a minimal computation time, for example, around 4 minutes on a single Nvidia® RTX 6000 graphic processor to extract ground deformation from a time series of 9 acquisitions of 7024×2488 pixels.

Figure 12:
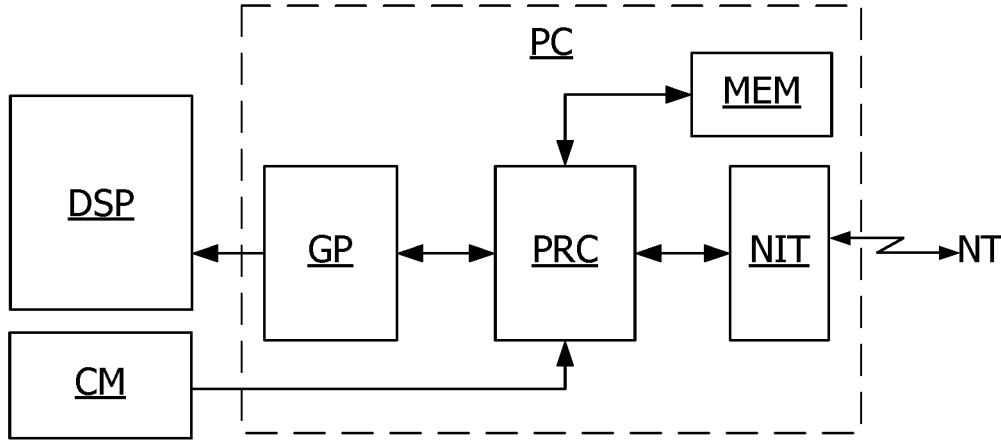
FIG. 12 is a block diagram of a classical personal computer that can be configured to implement the image processing method.

FIG. 12 illustrates components of a conventional personal computer. The computer PC comprises at least one processor PRC, and, operatively coupled to the processor, user interfaces DSP, CM, memories MEM, a graphic processor GP, and communication circuits NIT. The memories MEM stores an operating system and applications. The user interfaces DSP, CM can include, for example, but not limited to a keypad CM and a computer display screen DSP connected to the graphic card GP. The communication circuits NIT enables the processor PRC to be operatively coupled to an electronic communication network NT such as the Internet. The memory MEM also includes computer readable program code components implementing the neural network CNN. For example, when these computer readable program code components are processed by the processor PRC, the program code components are configured to cause execution of the method for processing time series of images, as described above.

The above description of various embodiments of the present invention is provided for purposes of description to one of ordinary skill in the related art. It is not intended to be exhaustive or to limit the invention to a single disclosed embodiment. Numerous alternatives and variations to the present invention will be apparent to those skilled in the art of the above teaching. Accordingly, while some alternative embodiments have been discussed specifically, other embodiments will be apparent or relatively easily developed by those of ordinary skill in the art.

In this respect, it is apparent to a person skilled in the art to perform the operations performed by the processing stages disclosed in FIG. 1 in other orders, and the number of processing stages can be varied. In particular, the processing stages SL4 and SL6 could be placed between other filtering stages FPs. The combination operations CB[s, f] performed by the processing stages SL4, SL6 could be performed in many other ways than selecting the maximum pixel value, such as using a summing or averaging function. The number of processing stages SLs and the number of images processed by each of the combining components CB[s, f] are set as a function of the number of images in the input time series RI, provided that each of the combining components CB[s, f] of the last processing stage SLs in the neural network CNN provides a single image FI[s, f] per time series. In addition, the model image EM could be introduced in the processing at another stage where the time component (index t) is no more present, and the number of filtering stages FPs before and after the introduction of the model image EM can also be varied depending on the type of images to process and more particularly the type of noise signals affecting the images to process.

In addition, the number and respective positions of the neighboring pixels and the number of adjacent images in the time series taken into account to compute the linear combinations can also be varied depending on the type of images to process and the type of noise signals affecting the images to process. Adjustment of the parameters L, M and U and the coefficients a, b, c that selects the adjacent pixels involved in the linear combinations FT[s, f] can be performed as a function of the amplitude of the perturbations affecting the images to be processed. Generally, these parameters and coefficients are selected between 1 and 4.

The addition of the bias coefficients B[s, f] in the filtering operations FPs is also optional although it introduces other degrees of freedom in the design of the neural network CNN. Removal of this bias coefficient could be easily compensated in terms of degree of freedom by adding one or more filtering operation FP which introduces a huge number of weighting coefficients W, and therefore a large number of degrees of freedom.

Application of the rectified linear unit function RL is also optional, and depends on the type of images to be processed. In the above examples, and more particularly when the images to be processed are InSAR images corrupted by atmospheric turbulence, it is desirable to give more importance to the positive values than to the negative values of the pixels. In other applications, other rectified linear unit functions could be more adapted. In addition, instead of using such a function, different weighting coefficients W could be defined as a function of the pixel value by which the weighting coefficient is multiplied.

In addition, the training phase for computing the coefficients (weighting coefficients W and bias coefficients B) of the neural network CNN does not need to be performed before each true image processing since these coefficients only depend on the type of images and signals to process. Accordingly, a computer implementing a neural network designed to process one type of images does not need to implement the training method and the method for generating the training data.

Further, the above-described method does not exclusively apply to InSAR images of ground acquired by Earth observation satellites. This method can easily adapted to process noisy image time series in which noise models are known, to extract motion signals between the images of the time series.

The above description is intended to embrace all alternatives, modifications and variations of the present invention that have been discussed herein, and other embodiments that fall within the spirit and scope of the above description. Limitations in the claims should be interpreted broadly based on the language used in the claims, and such limitations should not be limited to specific examples described herein.

The invention claimed is:

1. A method for processing time series of images of a same area, subjected to noise, the method comprising:

executing by a trained convolutional neural network comprising a plurality of convolutional layers and pooling layers, the convolutional layers implementing linear combinations of pixels with learned weighting coefficients, a plurality of successive filtering steps comprising a first filtering step receiving an input image time series, a last filtering step providing an output image, and intermediary filtering steps, each of the first filtering step and the intermediary filtering steps transforming a set of time series of filtered images initially including the input image time series, the set being transformed by generating a number of time series of filtered images by combining by linear combinations each pixel of each image of each time series of the set with selected neighboring pixels in the image and in an adjacent image of the image time series of the set, each linear combinations using a respective set of weighting coefficients and resulting in a pixel of one of generated filtered images; and executing by the convolutional neural network one or more combination operations, the combination operations being implemented by the pooling layers, each combination operation being performed between two successive of the intermediary filtering steps, to reduce a number of images in each of the time series of filtered images of the set, by combining images of subsets of adjacent images in each of the time series of filtered images of the set, a last one of the combination operations reducing each time series of filtered images of the set to a single filtered image.

2. The method of claim 1, further comprising, after the last combination operation, introducing a model image of the area in the set as an additional filtered image, the introduction of the model image being followed by one or more of the filtering steps.

3. The method of claim 1, wherein each of the linear combinations includes a bias coefficient which is added to a result of the linear combination.

4. The method of claim 1, wherein:

each of the weighting coefficients has a value depending on a sign, positive or negative of a pixel value to which it is multiplied, or the result of each of the linear combinations is transformed by a rectified linear unit function.

5. The method of claim 1, further comprising:
generating first image time series from a ground deformation model using randomly selected parameters;
generating training image time series, from the first image time series, using models of different noise signals; and
using the generated training image time series to adjust values of the weighting coefficients.

6. The method of claim 5, wherein the values of the weighting coefficients are iteratively adjusted by applying an iterative gradient-based descent minimization method using the training image time series and a model cost function, so as to minimize the result of the model cost function.

7. The method of claim 1, wherein the generation of the set of times series of filtered images from the input image time series are performed using the following equation:

$$PX[i, j, t, f] =$$
$$LR\left(B[f] + \sum_{l=1}^{L}\sum_{m=1}^{M}\sum_{u=1}^{U}(W[l, m, u, f].PX[i+3l, j+3m, t+u])\right),$$

wherein PX[i, j, t, f] is one pixel of one of the filtered images of time series f of filtered images, PX[i, j, t] is one pixel of one image of the input image time series, W[l, m, u, f] is one of first coefficients for the time series f of filtered images, B[f] is a bias coefficient for the time series f, and LR( ) is a rectified linear unit function.

8. The method of claim 1, wherein each linear combination of first filtering operations of the filtering operations applies the following equation:

$$PX[i, j, t, f'] = LR$$
$$\left(B[s, f'] + \sum_{l=1}^{L}\sum_{m=1}^{M}\sum_{u=1}^{U}\sum_{f=1}^{F}(W[s, l, m, u, f, f'].PX[i+3l, j+3m, t+u, f])\right)$$

wherein PX[i, j, t, f'] is one pixel of one of the filtered images of the time series of filtered images f', W[s, l, m, u, f, f'] is one of second weighting coefficients for the time series f' of filtered images for the filtering operations, B[s, f'] is a bias coefficient for the time series f' and the filtering operation s, and LR( ) is a leaky rectified linear unit function.

9. The method of claim 1, wherein each linear combination of second filtering operations of the filtering operations applies the following equation:

$$PX[i, j, f'] =$$
$$LR\left(B[s, f'] + \sum_{l=1}^{L}\sum_{m=1}^{M}\sum_{f=1}^{F}(W[s, l, m, f, f'].PX[i+3l, j+3m, f])\right)$$

wherein PX[i, j, f'] is one pixel of one of filtered images f', W[s, l, m, f, f'] is one of the second weighting coefficients for the filtered images f' for the filtering operation s, B[s, f'] is a bias coefficient for the filtered images f' and the filtering operation s, and LR( ) is a leaky rectified linear unit function.

10. The method of claim 9, wherein each pixel of the output image is computed by the following equation:

$$PX[i, j] = LR\left(B + \sum_{l=1}^{L}\sum_{m=1}^{M}\sum_{f=1}^{F}(W[l, m, f].PX[i+3l, j+3m, f])\right)$$

wherein PX[i, j] is one pixel of the output image, PX[i, j, f] is one pixel of filtered image f, W[l, m, f] is one of third coefficients, B is a bias coefficient, and LR( ) is a leaky rectified linear unit function.

11. The method of one claim 1, wherein a leaky rectified linear unit function LR is such that LR(x)=x if x≥0 and LR(x)=0.5x if x<0.

12. The method of claim 1, wherein each of the image combination operations applies the following equation:

$$PX[i, j, t, f] = \underset{u=1.2.3}{\mathrm{MAX}}(PX[i, j, 3(t-1)+u, f])$$

wherein PX[i, j, t, f] is one pixel of one of the filtered images of the time series of filtered images f, and MAX(PX[i, j, t+u, f]) is a function providing the maximum value among the pixel values PX[i, j, t+u, f] with u=−1, 0 and 1.

13. A computer comprising:
a processor; and
a memory coupled to the processor, the memory comprising instructions that, when executed by the processor, cause the processor to:
execute by a trained convolutional neural network comprising a plurality of convolutional layers and pooling layers, the convolutional layers implementing linear combinations of pixels with learned weighting coefficients, a plurality of successive filtering steps comprising a first filtering step receiving an input image time series, a last filtering step providing an output image, and intermediary filtering steps, each of the first filtering step and the intermediary filtering steps transforming a set of time series of filtered images initially including the input image time series, the set being transformed by generating a number of time series of filtered images by combining by linear combinations each pixel of each image of each time series of the set with selected neighboring pixels in the image and in an adjacent image of the image time series of the set, each linear combinations using a respective set of weighting coefficients and resulting in a pixel of one of the generated filtered images; and
execute by the convolutional neural network one or more combination operations, the combination operations being implemented by the pooling layers, each combination operation being performed between two successive of the intermediary filtering steps, to reduce a number of images in each of the time series of filtered images of the set, by combining images of subsets of adjacent images in each of the time series of filtered images of the set, a last one of the combination operations reducing each time series of filtered images of the set to a single filtered image.

14. A non-transitory computer-readable storage medium storing a program product comprising code portions which, when executed by a computer, cause the computer to:
execute by a trained convolutional neural network comprising a plurality of convolutional layers and pooling layers, the convolutional layers implementing linear combinations of pixels with learned weighting coefficients, a plurality of successive filtering steps comprising a first filtering step receiving an input image time series, a last filtering step providing an output image, and intermediary filtering steps, each of the first filtering step and the intermediary filtering steps transforming a set of time series of filtered images initially including the input image time series, the set being transformed by generating a number of time series of filtered images by combining by linear combinations each pixel of each image of each time series of the set with selected neighboring pixels in the image and in an adjacent image of the image time series of the set, each linear combinations using a respective set of weighting coefficients and resulting in a pixel of one of the generated filtered images; and execute by the convolutional neural network one or more combination operations, the combination operations being implemented by the pooling layers, each combination operation being performed between two successive of the intermediary filtering steps, to reduce a number of images in each of the time series of filtered images of the set, by combining images of subsets of adjacent images in each of the time series of filtered images of the set, a last one of the combination operations reducing each time series of filtered images of the set to a single filtered image.

\* \* \* \* \*